UNITED STATES PATENT OFFICE.

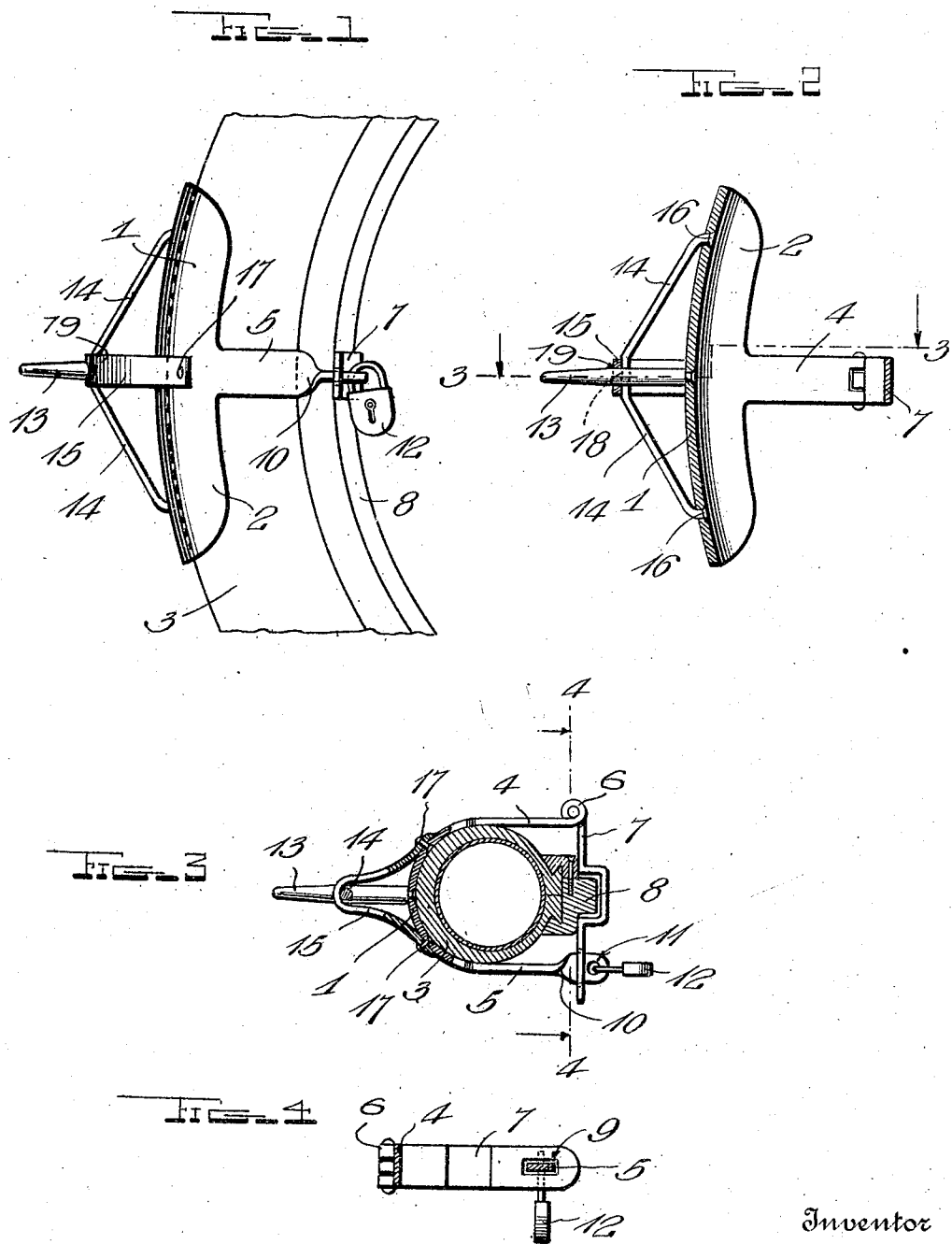

CHARLES D. GILLESPIE, OF OAKLAND, CALIFORNIA.

CHOCK FOR VEHICLE-WHEELS.

1,166,828.  Specification of Letters Patent.  Patented Jan. 4, 1916.

Application filed June 7, 1915. Serial No. 32,642.

*To all whom it may concern:*

Be it known that I, CHARLES D. GILLESPIE, a citizen of the United States, residing at Oakland, in the county of Alameda and State of California, have invented certain new and useful Improvements in Chocks for Vehicle-Wheels; and I do declare the following to be a full, clear, and exact description of the invention, such as will enable others skilled in the art to which it appertains to make and use the same.

This invention relates to new and useful improvements in chocks for vehicle wheels and more particularly those adapted for use on an automobile and the primary object of the invention is to provide an improved device of this character wherein the same may be releasably locked to any automobile wheel to prevent the wheel from being revolved whereby there can be no unauthorized use or theft of the machine.

A further object of the invention is to provide a device which is simple and durable in construction, inexpensive to manufacture, and one which will be very efficient in operation.

With these and numerous other objects in view my invention consists of certain novel features of construction, combination and arrangement of parts which will be herein referred to and more particularly pointed out in the specification and claims.

In the accompanying drawings: Figure 1 is a side elevation of my improved device applied to an auto wheel: Fig. 2 is a central vertical longitudinal section; Fig. 3 is a horizontal section on the line 3—3 of Fig. 2; and, Fig. 4 is a detail vertical transverse section on the line 4—4 of Fig. 3.

In describing my invention I shall refer to the drawing in which similar reference characters designate corresponding parts throughout the several views and in which the numeral 1 designates the body portion of the chock having down turned side edges 2 adapted to fit the tread of a tire 3. The side edges 2 of the body portion 1 have extensions 4 and 5, and an arm 7 is adapted to be pivoted on the extension 4 at 6 to engage the rim 8 of an automobile wheel.

The opposite extension 5 of the body portion 1 is given a quarter turn near one end as shown at 10 and has an aperture 11 in said end for a purpose to be more fully described. The corresponding end of the arm 7 has a longitudinally extending slot 9 through which the end of the extension 5 is adapted to project when the arm is in closed position. A padlock 12 is adapted to project through the aperture 11 to lock the parts in position.

Projecting from the outer edge of the body portion 1 is a radially extending centrally disposed spur 13 having a contracted lower end adapted to be rigidly secured in an aperture through the body. Reinforcing arch-shaped brace bars 14 and 15 are provided to rigidly support the spur 13 in operative position. The brace bar 14 which comprises a metallic rod extends longitudinally of the body portion 1 and is secured at its ends 16 to the said body portion and its crown is adapted to project through an opening in the spur 13 as shown at 18. The other brace rod 15 which is formed of a metallic strap extends transversely of the body portion 1 and is secured at its ends 17 to the same. This brace strap has its crown apertured at 19 so that the spur 13 is adapted to project therethrough and said crown will be spaced slightly above where the brace rod 14 projects through the spur.

In operation, when my improved chock is to be applied to one of the wheels of an automobile, the body portion 1 is applied to the tread 3 of the tire and the arm 7 is positioned to engage the rim 8 of the wheel whereby the longitudinal slot 9 in the end of the arm 7 is adapted to have the end of the extension 5 project therethrough and the aperture in the end will be spaced below the end of said arm. A padlock of any preferred form is inserted through the said aperture and locked thereby locking the chock firmly to the wheel.

It will be obvious that any accidental revolution of the wheel will be prevented, and even upon the application of power its progress will be greatly impeded, by reason of the radially projecting spur 13 on the outer surface of the body portion 1 of the chock. The reinforcing brace bars 14 and 15 enable the same to insure a safe and perfect performance of the aforesaid function.

Unauthorized persons in attempting to use the vehicle will be prevented from so doing by the chock, or even if they should attempt to run the vehicle the irregular movement of the wheel will prevent any rapid movement of the machine, and will render detection a comparative certainty.

From the foregoing description of the construction of my improved device the manner of applying the same to use and the operation thereof will be readily understood and it will be seen that I have provided a simple, inexpensive and efficient means for carrying out the objects of this invention.

While I have particularly described the elements best adapted to perform the functions set forth, it is obvious that various changes in form, proportion and the minor details of construction may be resorted to, within the scope of the appended claims, without departing from the spirit or sacrificing any of the principles of the invention.

I claim as my invention:

1. A chock with a body adapted to releasably engage the tread of the tire of a wheel, a centrally disposed spur projecting radially from said body, a longitudinally extending arch-shaped brace bar secured at its ends to said body and having its crown projecting through the spur, and a transversely extending arch-shaped brace bar secured at its ends to the body and having its crown apertured to receive the said spur.

2. A chock with a body adapted to releasably engage the tread of a tire of the wheel, a centrally disposed spur projecting radially from said body, a longitudinally extending arch-shaped metallic rod secured at its ends to said body adjacent the ends of the same, a transversely extending arch-shaped metallic strap having its ends secured to said body adjacent the sides of the same, and a crown portion of the rod engaging the spur at a point intermediate its ends and spaced from the body portion.

3. A chock with a body adapted to releasably engage the tread of the wheel, a spur having a contracted inner end rigidly secured in a centrally disposed aperture in the body and projecting radially therefrom, a longitudinally extending arch-shaped metallic rod secured at its ends to said body adjacent the ends of the same, the crown portion of said rod projecting through the opening in the spur intermediate its ends, a transversely extending metallic strap having its ends secured to said body adjacent the sides of the same and its crown portion apertured to allow the spur to project therethrough, and the crown portion of the rod and strap engaging the spur at a point intermediate its ends and spaced from the body portion.

In testimony whereof I have hereunto set my hand in presence of subscribing witnesses.

CHARLES D. GILLESPIE.

Witnesses:
JOHN J. MCDONALD,
BURTON B. BRACE,
J. A. KENNEDY.

Copies of this patent may be obtained for five cents each, by addressing the "Commissioner of Patents, Washington, D. C."